US010752838B2

(12) United States Patent
Ohishi

(10) Patent No.: US 10,752,838 B2
(45) Date of Patent: Aug. 25, 2020

(54) LIQUID CRYSTAL COMPOSITION AND LIQUID CRYSTAL DISPLAY DEVICE USING THE SAME

(71) Applicant: DIC Corporation, Tokyo (JP)

(72) Inventor: Haruki Ohishi, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 56 days.

(21) Appl. No.: 15/580,427

(22) PCT Filed: Jun. 28, 2016

(86) PCT No.: PCT/JP2016/069097
§ 371 (c)(1),
(2) Date: Dec. 7, 2017

(87) PCT Pub. No.: WO2017/002791
PCT Pub. Date: Jan. 5, 2017

(65) Prior Publication Data
US 2018/0298283 A1    Oct. 18, 2018

(30) Foreign Application Priority Data
Jul. 2, 2015 (JP) .................... 2015-133581

(51) Int. Cl.
G02F 1/1333    (2006.01)
C09K 19/34    (2006.01)
C09K 19/54    (2006.01)
C09K 19/12    (2006.01)
C09K 19/42    (2006.01)
C09K 19/20    (2006.01)
C09K 19/18    (2006.01)
C09K 19/30    (2006.01)
C09K 19/32    (2006.01)
G02B 3/14    (2006.01)
C09K 19/04    (2006.01)
G02B 30/00    (2020.01)
G02F 1/29    (2006.01)

(52) U.S. Cl.
CPC .......... *C09K 19/3458* (2013.01); *C09K 19/12* (2013.01); *C09K 19/18* (2013.01); *C09K 19/20* (2013.01); *C09K 19/30* (2013.01); *C09K 19/3001* (2013.01); *C09K 19/3059* (2013.01); *C09K 19/322* (2013.01); *C09K 19/34* (2013.01); *C09K 19/3447* (2013.01); *C09K 19/42* (2013.01); *C09K 19/54* (2013.01); *C09K 2019/0444* (2013.01); *C09K 2019/0466* (2013.01); *C09K 2019/122* (2013.01); *C09K 2019/2035* (2013.01); *C09K 2019/3063* (2013.01); *C09K 2019/3075* (2013.01); *C09K 2019/3077* (2013.01); *C09K 2019/325* (2013.01); *C09K 2019/3422* (2013.01); *G02B 3/14* (2013.01); *G02B 30/00* (2020.01); *G02F 1/29* (2013.01)

(58) Field of Classification Search
CPC .... C09K 19/3458; C09K 19/12; C09K 19/18; C09K 19/20; C09K 19/30; C09K 19/3001; C09K 19/3059; C09K 19/322; C09K 19/34; C09K 19/3447; C09K 19/42; C09K 19/54; C09K 2019/0444; C09K 2019/0466; C09K 2019/122; C09K 2019/2035; C09K 2019/3063; C09K 2019/3075; C09K 2019/3077; C09K 2019/325; C09K 2019/3422; G02F 1/29; G02F 1/1333; G02B 3/14; G02B 27/22
USPC ................................. 252/299.01
See application file for complete search history.

(56) References Cited

U.S. PATENT DOCUMENTS

| 5,447,657 A | 9/1995 | Schadt et al. |
| 5,868,962 A * | 2/1999 | Rieger ............... C09K 19/3001 252/299.61 |
| 5,879,585 A | 3/1999 | Miyazawa et al. |

(Continued)

FOREIGN PATENT DOCUMENTS

| JP | 6-199713 A | 7/1994 |
| JP | 10-175888 A | 6/1998 |

(Continued)

OTHER PUBLICATIONS

Adv. Liq. Cryst. Res. Appl.,Proc. Liq. Cryst. Conf. Soc. Countries, 3rd vol. 2, pp. 1029-38. (Year: 1981).*

(Continued)

Primary Examiner — Geraldina Visconti
(74) Attorney, Agent, or Firm — Westerman, Hattori, Daniels & Adrian

(57) ABSTRACT

An object of the present invention is to provide a composition that realizes high Δn, has a wide liquid crystal phase temperature range, small viscosity, excellent low-temperature solubility, and high resistivity and voltage holding ratio, and is stable against heat and light, and to provide a liquid crystal composition having an excellent lens effect and excellent chemical stability using the composition, and a liquid crystal display device and a liquid crystal lens that use the liquid crystal composition. The present invention provides a liquid crystal composition that contains one or two or more compounds represented by general formula (i) and one or two or more compounds represented by general formula (ii), a liquid crystal display device using the liquid crystal composition, a liquid crystal lens using the liquid crystal composition, and a birefringence lens for stereoscopic image display using the liquid crystal composition.

12 Claims, No Drawings

(56) References Cited

U.S. PATENT DOCUMENTS

2011/0175906 A1   7/2011  Zheng et al.
2012/0313042 A1  12/2012  Yanai et al.
2015/0085214 A1   3/2015  Hayashi et al.

FOREIGN PATENT DOCUMENTS

JP     2011-150344 A    8/2011
JP     2012-255067 A   12/2012
JP      2015-84077 A    4/2015

OTHER PUBLICATIONS

International Search Report dated Aug. 2, 2016, issued in counterpart International Application No. PCT/JP2016/069097 (2 pages).

* cited by examiner

LIQUID CRYSTAL COMPOSITION AND LIQUID CRYSTAL DISPLAY DEVICE USING THE SAME

TECHNICAL FIELD

The present invention relates to a composition having a positive dielectric anisotropy (Δε) useful as organic electronic materials and medical and agricultural chemicals, in particular, liquid crystal materials for electrooptic liquid crystal displays and liquid crystal materials for liquid crystal lenses, and to a liquid crystal display device using the composition.

BACKGROUND ART

Liquid crystal display devices are being used in watches, calculators, various measurement instruments, automobile panels, word processors, electronic notepads, printers, computers, televisions, clocks, advertising board, etc. Typical examples of the liquid crystal display mode include twisted nematic (TN) mode, super twisted nematic (STN) mode, and vertical alignment and in-plane-switching (IPS) modes that use thin film transistors (TFTs). Recent years have seen a trend towards narrowing the cell gap (d) of liquid crystal cells to increase the driving speed of these liquid crystal display devices. Here, there is a limitation that the value (retardation) of the product (d×Δn) of the cell gap and the refractive index anisotropy (Δn) needs to be optimized. Thus, narrowing the cell gap (decreasing d) inevitably leads to increasing the value Δn. As such, there is need to increase the value Δn of the liquid crystal composition, and liquid crystal compositions having a larger Δn value than existing liquid crystal compounds are in demand.

Meanwhile, liquid crystal lenses that utilize birefringence of liquid crystal materials are available as one example of devices to which the liquid crystal compositions are applied. Liquid crystal lenses are being used as 2D-3D switching lenses, focusing lenses for cameras, etc.

These applications all involve sealing a liquid crystal composition between glass or film substrates and applying voltage to the liquid crystal composition aligned by an alignment film so as to cause alignment deformation of the liquid crystal composition and changes in the refractive index of the liquid crystal material so that the lens function is exhibited.

Examples of the substrates that seal in the liquid crystal material include a pair of common flat substrates, and a pair of substrates, one of which is processed into a lens shape. When both of the pair of substrates are flat, the arrangement of the electrodes is adjusted so that, in spite of the flat substrates, incoming light passing through the substrates is refracted by a liquid crystal layer aligned into a lens shape under application of an electric field that causes the liquid crystal molecules sealed between the substrates to align into the lens shape (PTL 1).

When a liquid crystal lens is used in 3D applications, the optical refraction caused by the liquid crystal lens and the binocular disparity are utilized so that the images on the right and on the left can be recognized by the right and left eyes so that the images can be recognized as a three dimensional object.

When the lens is used as a focusing lens for cameras, the refractive index is changed by adjusting the magnitude of the voltage applied so as to adjust the focal point distance.

With this type of liquid crystal lenses, the desired lens effect is obtained by using a thin cell when the change in refractive index caused by the change in alignment of the liquid crystal composition used therein is large. Thus, the liquid crystal composition used therein is required to have a high birefringence (Δn) not achievable by existing liquid crystal compositions. However, first of all, it is difficult to adjust Δn to a desired value; furthermore, it is extremely difficult to develop a liquid crystal composition that has practicable values for other physical properties such as the liquid crystal phase temperature range and viscosity, in addition to the required value Δn.

CITATION LIST

Patent Literature

[PTL 1] Japanese Unexamined Patent Application Publication No. 2015-84077

SUMMARY OF INVENTION

Technical Problem

An object of the present invention is to provide a composition that realizes high Δn, has a wide liquid crystal phase temperature range, small viscosity, excellent low-temperature solubility, and high resistivity and voltage holding ratio, and is stable against heat and light, and to provide a liquid crystal composition having an excellent lens effect and excellent chemical stability using the composition, and a liquid crystal display device and a liquid crystal lens that use the liquid crystal composition.

Solution to Problem

To achieve the object described above, the inventors of the present application have conducted studies and syntheses of various compounds and have found that the object can be effectively achieved by using particular compounds. Thus, the present invention has been made.

The present invention provides a liquid crystal composition comprising one or two or more compounds represented by general formula (i):

[Chem. 1]

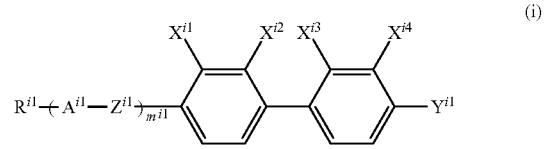

(i)

(in the formula, $R^{i1}$ represents an alkynyl group having 2 to 12 carbon atoms, one —$CH_2$— or two or more non-adjacent —$CH_2$— in the alkynyl group may each independently be substituted with —CH=CH—, —C≡C—, —O—, —CO—, —COO—, or OCO—, and one or two or more hydrogen atoms present in $R^{i1}$ may each independently be substituted with a fluorine atom, $Y^{i1}$ represents a hydrogen atom, a fluorine atom, a chlorine atom, a cyano group, or an alkyl group having 1 to 12 carbon atoms, one —$CH_2$— or two or more non-adjacent —$CH_2$— in the alkyl group may each independently be substituted with —CH=CH—, —C≡C—, —O—, —CO—, —COO—, or OCO—, one or two or more hydrogen atoms present in $Y^{i1}$ may each independently be substituted with a fluorine atom, $X^{i1}$ to $X^{i4}$ each independently represent a hydrogen atom or a fluorine atom, $X^{i1}$ and $X^{i2}$ never represent fluorine atoms at the same time, and $X^{i3}$ and $X^{i4}$ never represent fluorine atoms at the same time, $A^{i1}$ represents a group selected from the group consisting of:
(a) a 1,4-cyclohexylene group (one —$CH_2$— or two or more non-adjacent —$CH_2$— present in this group may each be substituted with —O—),
(b) a 1,4-phenylene group (one —CH═ or two or more non-adjacent —CH═ present in this group may each be substituted with —N═) and
(c) a naphthalene-2,6-diyl group, a 1,2,3,4-tetrahydronaphthalene-2,6-diyl group, or a decahydronaphthalene-2,6-diyl group (one —CH═ or two or more non-adjacent —CH═ present in the naphthalene-2,6-diyl group or the 1,2,3,4-tetrahydronaphthalene-2,6-diyl group may each be substituted with —N═),
where the group (a), the group (b), and the group (c) may each independently be substituted with a halogen atom or a cyano group, $Z^{i1}$ represents —$OCH_2$—, —$CH_2O$—, —$C_2H_4$—, —$C_4H_8$—, —COO—, —OCO—, —CH═CH—, —CF═CF—, —$CF_2O$—, —$OCF_2$—, —$CF_2CF_2$—, —C≡C— or a single bond, and $m^{i1}$ represents 0 or 1).

Also provided are a liquid crystal display device that uses the liquid crystal composition, a liquid crystal lens that uses the liquid crystal composition, and a birefringence lens for stereoscopic image display that uses the liquid crystal composition.

Advantageous Effects of Invention

A liquid crystal composition that contains a compound represented by general formula (i) provided by the present invention is stable against heat, light, etc., can be easily industrially manufactured, and has a significantly high Δn, low viscosity, and a wide liquid crystal phase temperature range.

Thus, the liquid crystal composition is very useful as a liquid crystal material for liquid crystal lenses that require large Δn.

DESCRIPTION OF EMBODIMENTS

One or a combination of two or more compounds represented by formula (i) may be used as the compound represented by formula (i).

When the content of the compound represented by general formula (i) is small in the liquid crystal composition of the present invention, the effect thereof is not exhibited; thus, the lower limit of the content in the composition is 1% by mass (hereinafter, % in the composition is % by mass), preferably 2%, preferably 5%, preferably 7%, preferably 9%, preferably 10%, preferably 12%, preferably 15%, preferably 17%, and preferably 20%. Since an excessively large content causes problems such as precipitation, the upper limit is preferably 50%, preferably 40%, preferably 30%, preferably 25%, preferably 20%, preferably 18%, preferably 15%, preferably 13%, and preferably 10%.

In general formula (i), $R^{i1}$ preferably represents an alkynyl group having 1 to 8 carbon atoms, and is preferably selected from the groups represented by formula (R1) to (R5). (In each formula, a dot represent a carbon atom in the ring structure.)

[Chem. 2]

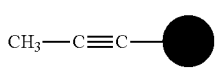

(R1)

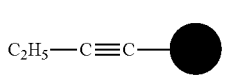

(R2)

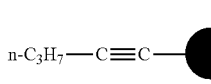

(R3)

(R4)

(R5)

In particular, (R3) and (R4) are preferable.

When the compound represented by general formula (i) is a p-type compound having a positive Δε, $Y^{i1}$ preferably represents a fluorine atom, a cyano group, a trifluoromethyl group, or a trifluoromethoxy group, and preferably represents a fluorine atom or a cyano group.

When the compound represented by general formula (i) is a nonpolar compound having a substantially zero Δε, $Y^{i1}$ is the same as $R^{i1}$ but $Y^{i1}$ and $R^{i1}$ may be the same or different.

When increasing Δn is desirable, $A^{i1}$ is preferably aromatic. In order to improve the response speed, $A^{i1}$ is preferably aliphatic. $A^{i1}$ preferably each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, and more preferably represents the following structure:

[Chem. 3]

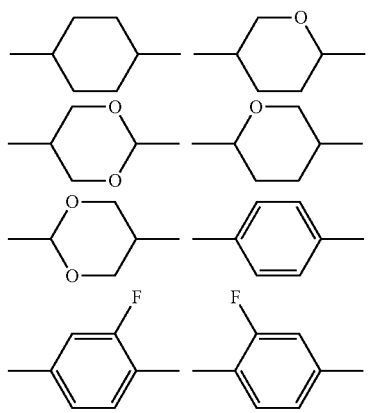

$A^{i1}$ more preferably represents a trans-1,4-cyclohexylene group or a 1,4-phenylene group.

$Z^{i1}$ preferably represents a single bond.

When solubility in the liquid crystal composition is important, $m^{i1}$ preferably represents 0, and when Δn and Tni are important, $m^{i1}$ preferably represents 1.

$X^{i1}$ to $X^{i4}$ preferably all represent a hydrogen atom or all represent a hydrogen atom except for one representing a fluorine atom; and $X^{i2}$ preferably represents a fluorine atom and the rest preferably represents a hydrogen atom.

Compounds represented by general formula (1-1) to general formula (1-57) below are preferable as the compound represented by general formula (i).

[Chem. 4]

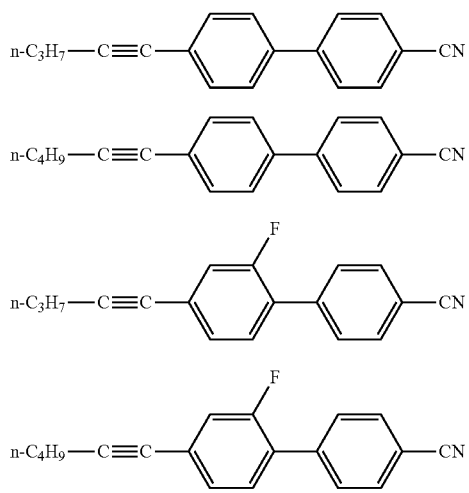

In order to adjust the physical property values of the liquid crystal composition, compounds having no liquid crystal phase may be added as needed in addition to the compounds having a liquid crystal phase.

Preferable representative examples of the compounds that can be used and mixed with the compound represented by general formula (i) to be contained in the composition provided by the present invention are compounds represented by general formulae (A1) to (A3), (B1) to (B3), and (C1) to (C3) At least one of these compounds is preferably contained.

The compounds represented by general formulae (A1) to (A3) are fluorine-based (halogen-based) p-type compounds.

[Chem. 5]

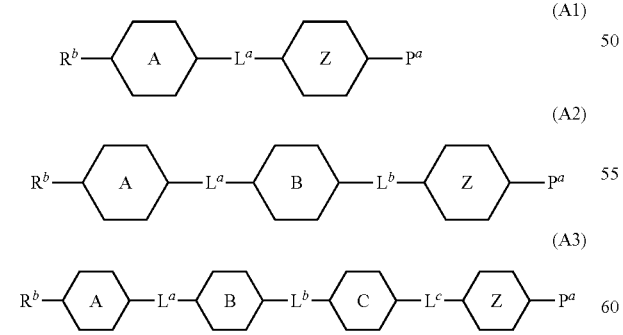

In the formulae described above, $R^b$ represents alkyl group having 1 to 12 carbon atoms, may be linear or have a methyl or ethyl branch, and may have a three- to six-membered ring structure; any —CH$_2$— present in the group may be substituted with —O—, —CH=CH—, —CH=CF—, —CF=CH—, —CF=CF—, or —C≡C—; and any hydrogen atom present in the group may be substituted with a fluorine atom or a trifluoromethoxy group. However, $R^b$ preferably represents a linear alkyl group having 1 to 7 carbon atoms, a linear 1-alkenyl group having 2 to 7 carbon atoms, a linear 3-alkenyl group having 4 to 7 carbon atoms, or an alkyl group having 1 to 5 carbon atoms with a terminal substituted with an alkoxyl group having 1 to 3 carbon atoms. When an asymmetric carbon is generated by branching, the compound may be optically active or racemic.

The ring A, the ring B, and the ring C each independently represent a trans-1,4-cyclohexylene group, a trans-decahydronaphthalene-trans-2,6-diyl group, a 1,4-phenylene group which may be substituted with one or more fluorine atoms, a naphthalene-2,6-diyl group which may be substituted with one or more fluorine atoms, a tetrahydronaphthalene-2,6-diyl group which may be substituted with one or more fluorine atoms, a 1,4-cyclohexenylene group which may be substituted with a fluorine atom, a 1,3-dioxane-trans-2,5-diyl group, a pyrimidine-2,5-diyl group, or a pyridine-2,5-diyl group, but preferably each independently represent a trans-1,4-cyclohexylene group, a trans-decahydronaphtha-lene-trans-2,6-diyl group, a naphthalene-2,6-diyl group which may be substituted with a fluorine atom, or a 1,4-phenylene group which may be substituted with one or two fluorine atoms. In particular, when the ring B represents a trans-1,4-cyclohexylene group or a trans-decahydronaphthalene-trans-2,6-diyl group, the ring A preferably represents a trans-1,4-cyclohexylene group; and when the ring C represents a trans-1,4-cyclohexylene group or a trans-decahydronaphthalene-trans-2,6-diyl group, the ring B and the ring A preferably represent a trans-1,4-cyclohexylene group. In (A3), the ring A is preferably a trans-1,4-cyclohexylene group.

$L^a$, $L^b$, and $L^c$ are linking groups and each independently represent a single bond, an ethylene group (—CH$_2$CH$_2$—), a 1,2-propylene group (—CH(CH$_3$)CH$_2$— and —CH$_2$CH(CH$_3$)—), a 1,4-butylene group, —COO—, —OCO—, —OCF$_2$—, —CF$_2$O—, —CH=CH—, —CH=CF—, —CF=CH—, —CF=CF—, —C≡C—, or —CH=NN=CH—, preferably each independently represent a single bond, an ethylene group, a 1,4-butylene group, —COO—, —OCF$_2$—, —CF$_2$O—, —CF=CF—, or —C≡C—, and more preferably each independently represent a single bond or an ethylene group. In (A2), at least one of these linking groups preferably represents a single bond, and in (A3), at least two of these linking groups preferably represent a single bond.

The ring Z is an aromatic ring and can be represented by general formulae (La) to (Lc) below:

[Chem. 6]

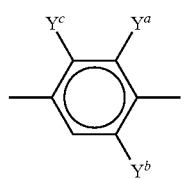

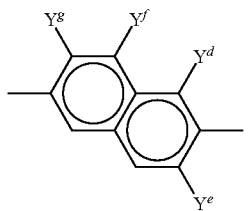

(Lb)

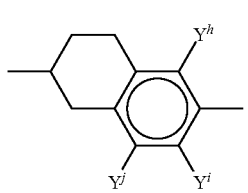

(Lc)

In the formulae, $Y^a$ to $Y^j$ each independently represent a hydrogen atom or a fluorine atom; however, in (La), at least one of $Y^a$ and $Y^b$ preferably represents a fluorine atom, and, in (Lb), at least one of $Y^d$ to $Y^f$ preferably represents a fluorine atom, and in particular, $Y^d$ preferably represents a fluorine atom.

The terminal group $p^a$ represents a fluorine atom, a chlorine atom, a trifluoromethoxy group, a difluoromethoxy group, a trifluoromethyl group, or a difluoromethyl group, or an alkoxyl, alkyl, alkenyl, or alkenyloxy group having 2 or 3 carbon atoms and substituted with two or more fluorine atoms, but particularly preferably represents a fluorine atom, a trifluoromethoxy group, or a difluoromethoxy group, and more preferably represents a fluorine atom.

When compounds represented by general formulae (A1) to (A3) are used in combination, the same alternatives (such as the ring A, $L^a$, etc.) in different molecules may represent the same substituent or different substituents.

Furthermore, in general formulae (A1) to (A3), the general formulae (i) and (ii) of the present invention are excluded.

The lower limit of the preferable contents of the compounds represented by general formula (A1) to (A3) relative to the total of the composition of the present invention is 1%, 2%, 5%, 8%, 10%, 13%, 15%, 18%, 20%, 22%, 25%, or 30%. The upper limit of the preferable contents is 30%, 28%, 25%, 23%, 20%, 18%, 15%, 13%, 10%, 8%, or 5%.

When the viscosity of the composition of the present invention needs to be maintained low and when a composition having high response speed is necessary, the lower limit is preferably relatively high and the upper limit is preferably relatively high. When Tni of the composition of the present invention needs to be maintained high and when a composition less prone to image-sticking is necessary, the lower limit is preferably relatively low and the upper limit is preferably relatively low. When it is desirable to increase the dielectric anisotropy to maintain the drive voltage low, the lower limit is preferably relatively high and the upper limit is preferably relatively high.

More preferable embodiments for general formulae (A1) to (A3) can be expressed by the following general formulae, (A1a) to (A3c).

[Chem. 7]

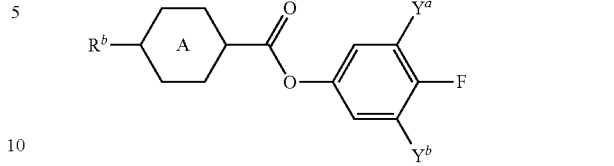

(A1a)

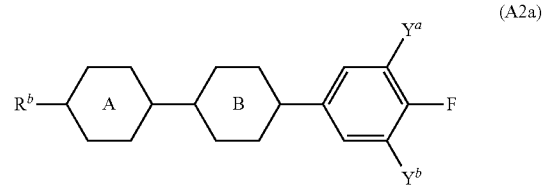

(A2a)

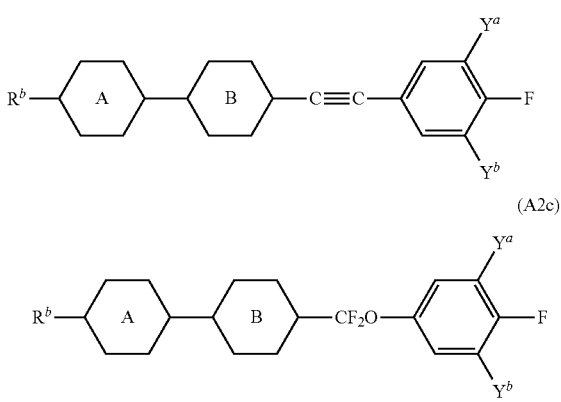

(A2b)

(A2c)

(A3a)

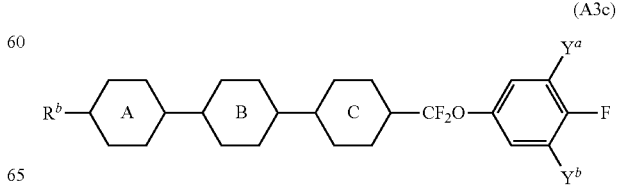

(A3b)

(A3c)

(In the formulae, A, B, C, $Y^a$, and $Y^b$ are the same as A, B, C, $Y^a$, and $Y^b$ in general formulae (A1) to (A3).)
The following compounds are more preferable.
[Chem. 8]
(A1a-1)
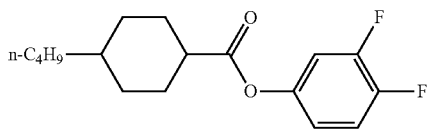
(A1a-2)
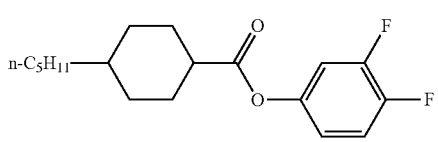
(A2a-1)
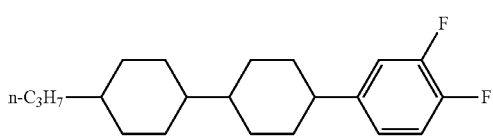
(A2a-2)
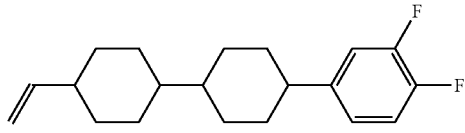
(A2b-1)
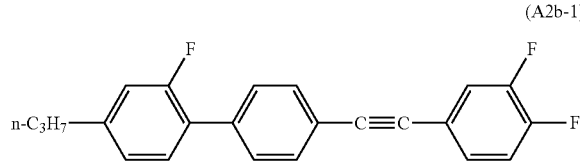
(A2b-2)
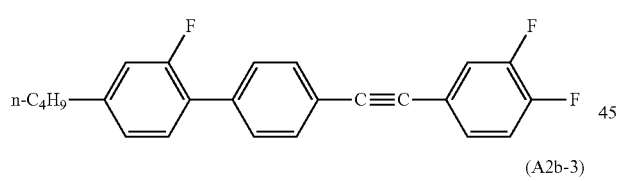
(A2b-3)
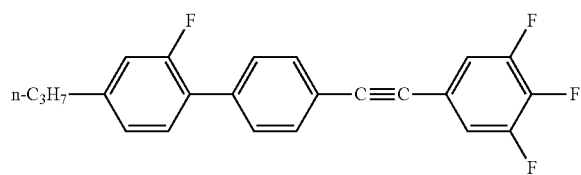
(A2c-1)
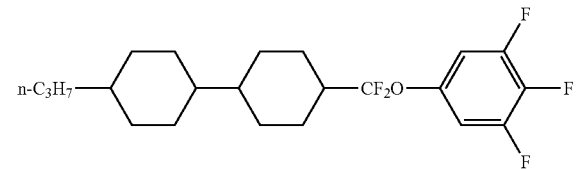
(A2c-2)
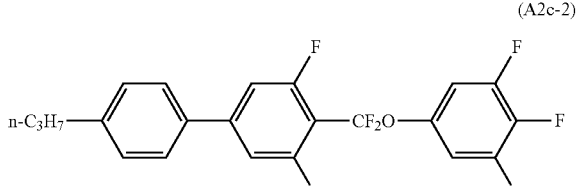
[Chem. 9]
(A3a-1)
(A3a-2)
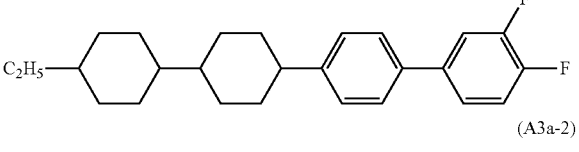
(A3a-3)
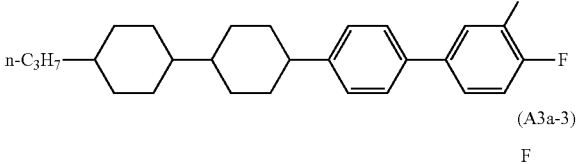
(A3a-4)
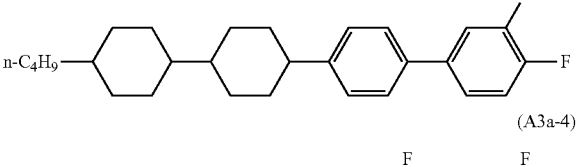
(A3b-1)
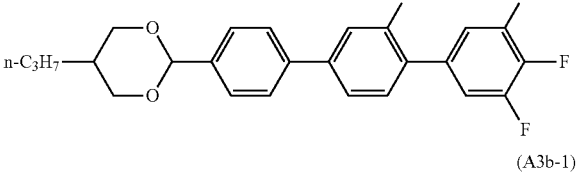
(A3c-1)
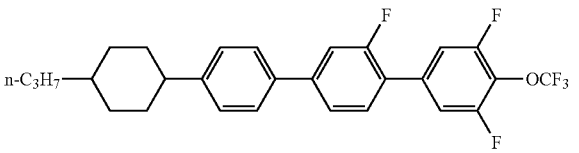
(A3c-2)
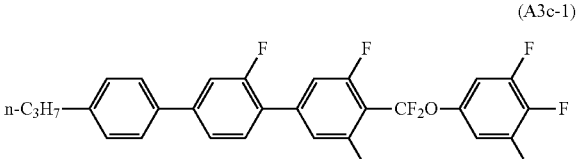
(A3c-3)
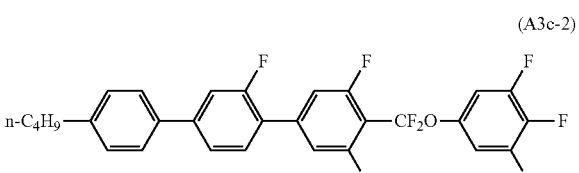
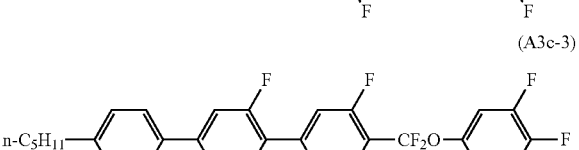

-continued

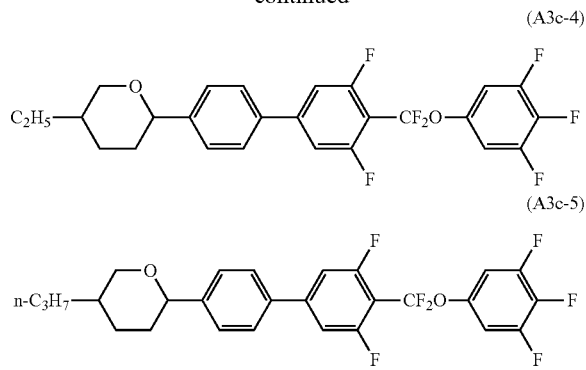

(A3c-4)

(A3c-5)

The compounds represented by general formulae (B1) to (B3) are cyano-based p-type compounds.

[Chem. 10]

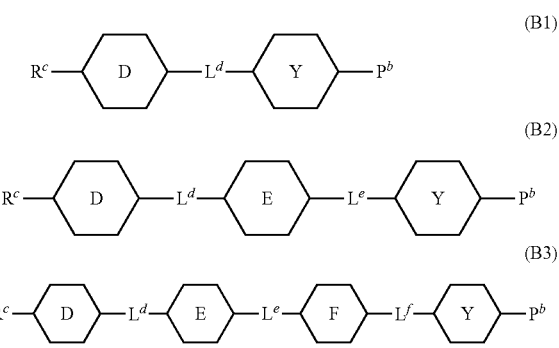

(B1)

(B2)

(B3)

In the formulae described above, $R^c$ represents alkyl group having 1 to 12 carbon atoms, may be linear or have a methyl or ethyl branch, and may have a three- to six-membered ring structure; any —CH$_2$— present in the group may be substituted with —O—, —CH=CH—, —CH=CF—, —CF=CH—, —CF=CF—, or —C≡C—; and any hydrogen atom present in the group may be substituted with a fluorine atom or a trifluoromethoxy group. However, $R^c$ preferably represents a linear alkyl group having 1 to 7 carbon atoms, a linear 1-alkenyl group having 2 to 7 carbon atoms, a linear 3-alkenyl group having 4 to 7 carbon atoms, or an alkyl group having 1 to 5 carbon atoms with a terminal substituted with an alkoxyl group having 1 to 3 carbon atoms. When an asymmetric carbon is generated by branching, the compound may be optically active or racemic.

The ring D, the ring E, and the ring F each independently represent a trans-1,4-cyclohexylene group, a trans-decahydronaphthalene-trans-2,6-diyl group, a 1,4-phenylene group which may be substituted with one or more fluorine atoms, a naphthalene-2,6-diyl group which may be substituted with one or more fluorine atoms, a tetrahydronaphthalene-2,6-diyl group which may be substituted with one or more fluorine atoms, a 1,4-cyclohexenylene group which may be substituted with a fluorine atom, a 1,3-dioxane-trans-2,5-diyl group, a pyrimidine-2,5-diyl group, or a pyridine-2,5-diyl group, but preferably each independently represent a trans-1,4-cyclohexylene group, a trans-decahydronaphthalene-trans-2,6-diyl group, a naphthalene-2,6-diyl group which may be substituted with a fluorine atom, or a 1,4-phenylene group which may be substituted with one or two fluorine atoms. In particular, when the ring E represents a trans-1,4-cyclohexylene group or a trans-decahydronaphthalene-trans-2,6-diyl group, the ring D preferably represents a trans-1,4-cyclohexylene group; and when the ring F represents a trans-1,4-cyclohexylene group or a trans-decahydronaphthalene-trans-2,6-diyl group, the ring D and the ring E preferably represent a trans-1,4-cyclohexylene group. In (B3), the ring D is preferably a trans-1,4-cyclohexylene group.

$L^d$, $L^e$, and $L^f$ are linking groups and each independently represent a single bond, an ethylene group (—CH$_2$CH$_2$—), a 1,2-propylene group (—CH(CH$_3$)CH$_2$— and —CH$_2$CH(CH$_3$)—), a 1,4-butylene group, —COO—, —OCO—, —OCF$_2$—, —CF$_2$O—, —CH=CH—, —CH=CF—, —CF=CH—, —CF=CF—, —C≡C—, —OCH$_2$—, —CH$_2$O—, or —CH=NN=CH—, preferably each independently represent a single bond, an ethylene group, —COO—, —OCF$_2$—, —CF$_2$O—, —CF=CF—, or —C≡C—, and more preferably each independently represent a single bond, an ethylene group, or —COO—. In (B2), at least one of these linking groups preferably represents a single bond, and in (B3), at least two of these linking groups preferably represent a single bond.

The ring Y is an aromatic ring and can be represented by general formulae ($L^d$) to ($L^f$) below:

[Chem. 11]

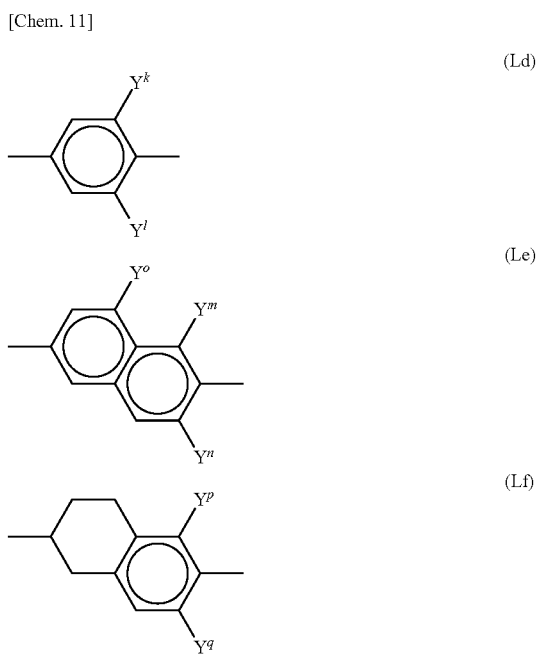

(Ld)

(Le)

(Lf)

In the formulae, $Y^k$ to $Y^q$ each independently represent a hydrogen atom or a fluorine atom; however, in (Le), $Y^m$ preferably represents a fluorine atom.

The terminal group $p^b$ represents a cyano group (—CN), a cyanato group (—OCN), or —C≡CCN, but preferably represents a cyano group.

When compounds represented by general formulae (B1) to (B3) are used in combination, the same alternatives (such as the ring D, $L^d$, etc.) in different molecules may represent the same substituent or different substituents.

Furthermore, in general formulae (B1) to (B3), general formulae (i) and (ii) of the present invention are excluded.

The lower limit of the preferable contents of the compounds represented by general formula (B1) to (B3) relative to the total of the composition of the present invention is 1%, 2%, 5%, 8%, 10%, 13%, 15%, 18%, 20%, 22%, 25%, or 30%. The upper limit of the preferable contents is 30%, 28%, 25%, 23%, 20%, 18%, 15%, 13%, 10%, 8%, or 5%.

When the viscosity of the composition of the present invention needs to be maintained low and when a composition having high response speed is necessary, the lower limit is preferably relatively low and the upper limit is preferably relatively high. When Tni of the composition of the present invention needs to be maintained high and when a composition less prone to image-sticking is necessary, the lower limit is preferably relatively low and the upper limit is preferably relatively high. When it is desirable to increase the dielectric anisotropy to maintain the drive voltage low, the lower limit is preferably relatively high and the upper limit is preferably relatively high.

More preferable embodiments for general formulae (B1) to (B3) can be expressed by the following general formulae, (B1a) to (B2c).

[Chem. 12]

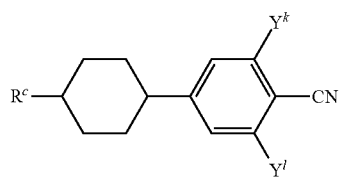
(B1a)

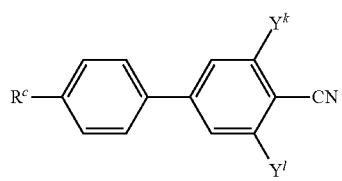
(B1b)

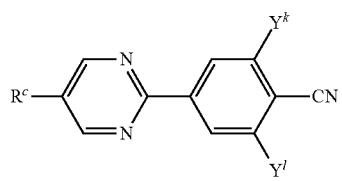
(B1c)

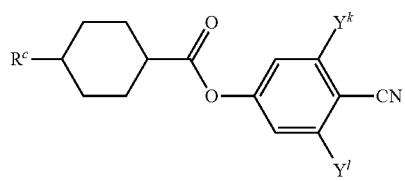
(B1d)

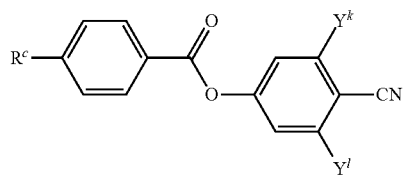
(B1e)

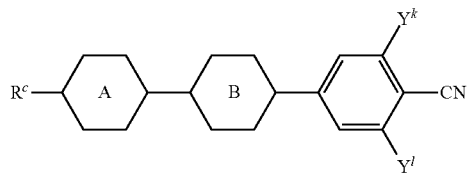
(B2a)

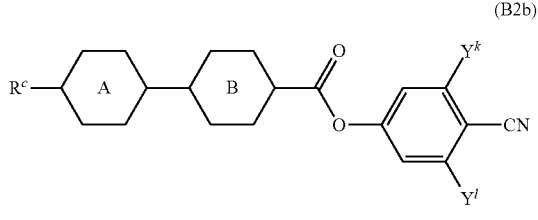
(B2b)

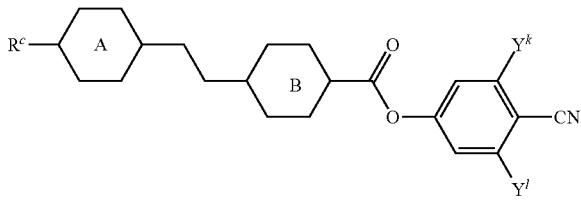
(B2c)

(In the formulae, A, B, $Y^k$, and $Y^l$ are the same as A, B, $Y^k$, and $Y^l$ in general formulae (B1) to (B3).)

The following compounds are more preferable.

[Chem. 13]

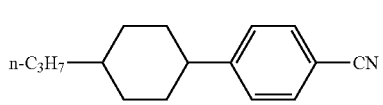
(B1a-1)

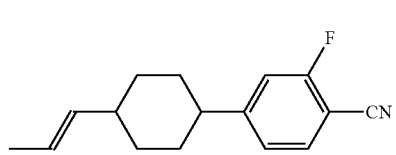
(B1a-2)

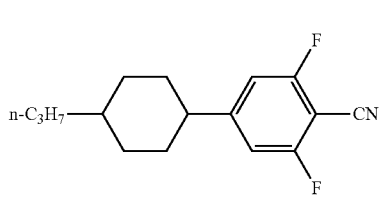
(B1a-3)

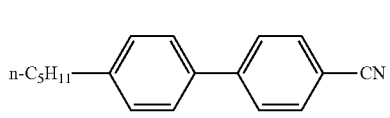
(B1b-1)

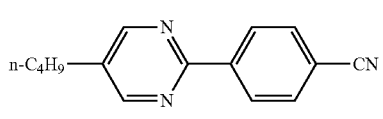
(B1c-1)

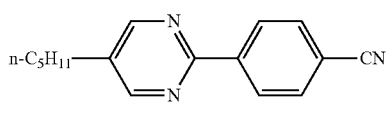
(B1c-2)

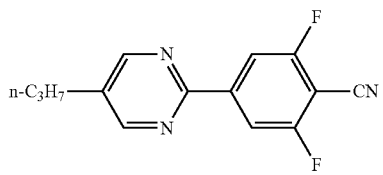
(B1c-3)

-continued (B1d-1) 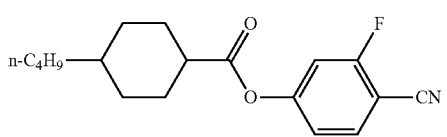

(B1d-2) 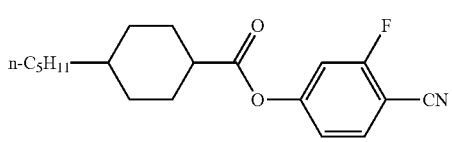

(B1e-1) 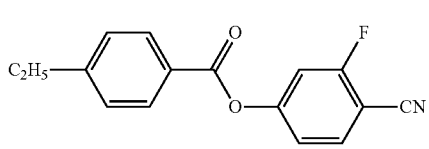

(B1e-2) 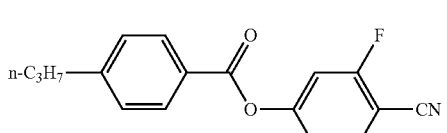

(B1e-3) 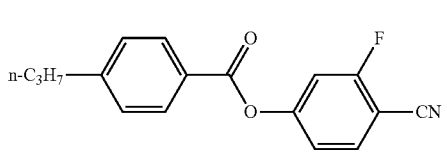

[Chem. 14]

(B2a-1) 

(B2a-2) 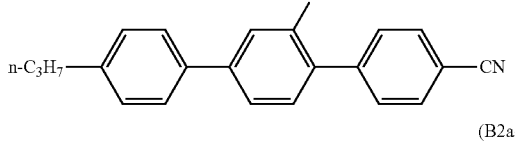

(B2a-3) 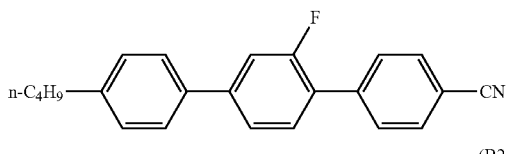

(B2a-4) 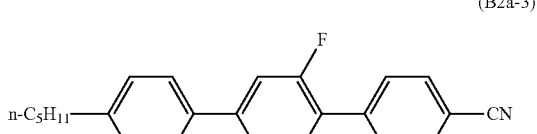

(B2a-5) 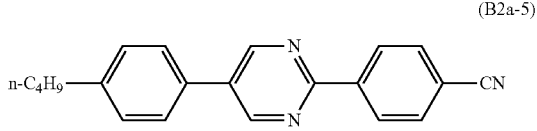

-continued (B2b-1) 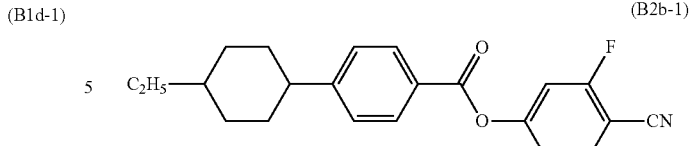

(B2b-2) 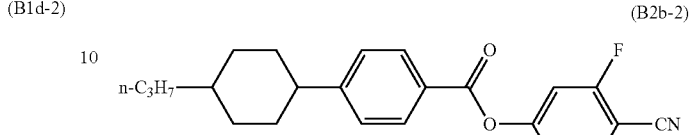

(B2b-3) 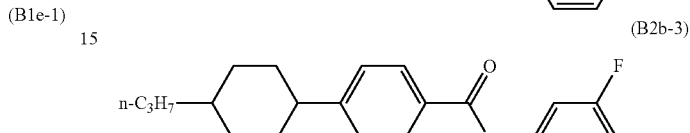

(B2c-1) 

(B2c-2) 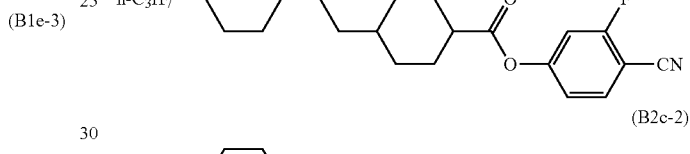

The compounds represented by general formulae (C1) to (C3) are non-polar compounds with dielectric anisotropy of about 0.

[Chem. 15]

(C1) 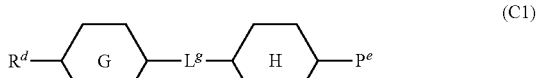

(C2) 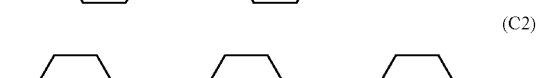

(C3) 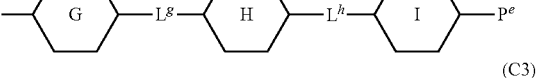

In the formulae described above, $R^d$ and $R^e$ each independently represent an alkyl group having 1 to 12 carbon atoms, may be linear or have a methyl or ethyl branch, and may have a three- to six-membered ring structure; any —CH$_2$—present in the group may be substituted with —O—, —CH=CH—, —CH=CF—, —CF=CH—, —CF=CF— or —C≡C—; and any hydrogen atom present in the group may be substituted with a fluorine atom or a trifluoromethoxy group. However, $R^d$ and $R^e$ preferably represent a linear alkyl group having 1 to 7 carbon atoms, a linear 1-alkenyl group having 2 to 7 carbon atoms, a linear 3-alkenyl group having 4 to 7 carbon atoms, a linear alkoxyl group having 1 to 3 carbon atoms, or a linear alkyl group having 1 to 5 carbon atoms with a terminal substituted with an alkoxyl group having 1 to 3 carbon atoms; and at least one of $R^d$ and $R^e$ preferably represents a linear alkyl group having 1 to 7 carbon atoms, a linear 1-alkenyl group having 2 to 7 carbon atoms, or a linear 3-alkenyl group having 4 to 7 carbon atoms. When an asymmetric carbon is generated by branching, the compound may be optically active or racemic.

The ring G, the ring H, the ring I, and the ring J each independently represent a trans-1,4-cyclohexylene group, a trans-decahydronaphthalene-trans-2,6-diyl group, a 1,4-phenylene group which may be substituted with one or two fluorine atoms or methyl groups, a naphthalene-2,6-diyl group which may be substituted with one or more fluorine atoms, a tetrahydronaphthalene-2,6-diyl group which may be substituted with one or two fluorine atoms, a 1,4-cyclohexenylene group which may be substituted with one or two fluorine atoms, a 1,3-dioxane-trans-2,5-diyl group, a pyrimidine-2,5-diyl group, or a pyridine-2,5-diyl group. Each of these compounds preferably has one or less of a trans-decahydronaphthalene-trans-2,6-diyl group, a naphthalene-2,6-diyl group which may be substituted with one or more fluorine atoms, a tetrahydronaphthalene-2,6-diyl group which may be substituted with one or two fluorine atoms, a 1,4-cyclohexenylene group which may be substituted with a fluorine atom, a 1,3-dioxane-trans-2,5-diyl group, a pyrimidine-2,5-diyl group, or a pyridine-2,5-diyl group, and other rings are preferably a trans-1,4-cyclohexylene group or a 1,4-phenylene group which may be substituted with one or two fluorine atoms or methyl groups.

$L^g$, $L^h$, and $L^i$ are linking groups and each independently represent a single bond, an ethylene group (—CH$_2$CH$_2$—), a 1,2-propylene group (—CH(CH$_3$)CH$_2$— and —CH$_2$CH(CH$_3$)—), a 1,4-butylene group, —COO—, —OCO—, —OCF$_2$—, —CF$_2$O—, —CH═CH—, —CH═CF—, —CF═CH—, —CF═CF—, —C≡C—, or —CH═NN═CH—, and preferably each independently represent a single bond, an ethylene group, a 1,4-butylene group, —COO—, —OCO—, —OCF$_2$—, —CF$_2$O—, —CF═CF—, —C≡C—, or —CH═NN═CH—. In (C2), at least one of these linking groups preferably represents a single bond; and in (C3) at least two of these linking groups preferably represent a single bond.

When compounds represented by general formulae (C1) to (C3) are used in combination, the same alternatives (such as the ring G, $L^g$, etc.) in different molecules may represent the same substituent or different substituents.

Furthermore, in general formulae (C1) to (C3), general formulae (A1) to (A3), (B1) to (B3), (i), and (ii) of the present invention are excluded.

The lower limit of the preferable contents of the compounds represented by general formula (C1) to (C3) relative to the total of the composition of the present invention is 1%, 2%, 5%, 8%, 10%, 13%, 15%, 18%, 20%, 22%, 25%, or 30%. The upper limit of the preferable contents is 30%, 28%, 25%, 23%, 20%, 18%, 15%, 13%, 10%, 8%, or 5%.

When the viscosity of the composition of the present invention needs to be maintained low and when a composition having high response speed is necessary, the lower limit is preferably relatively low and the upper limit is preferably relatively high. When Tni of the composition of the present invention needs to be maintained high and when a composition less prone to image-sticking is necessary, the lower limit is preferably relatively high and the upper limit is preferably relatively high. When it is desirable to increase the dielectric anisotropy to maintain the drive voltage low, the lower limit is preferably relatively low and the upper limit is preferably relatively low.

More preferable embodiments for general formula (C1) can be expressed by the following general formulae, (C1a) to (C1h).

[Chem. 16]

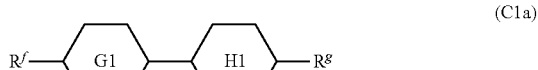

(C1a)

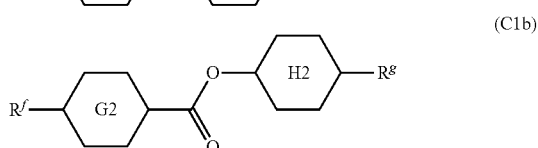

(C1b)

(C1c)

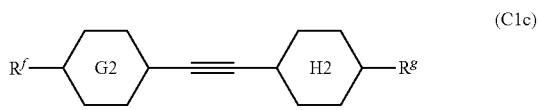

(C1d)

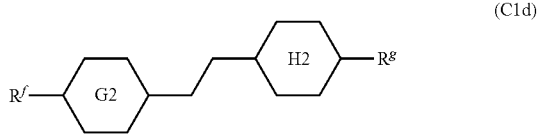

(C1e)

(C1f)

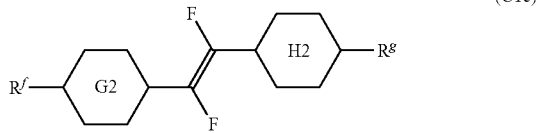

(C1g)

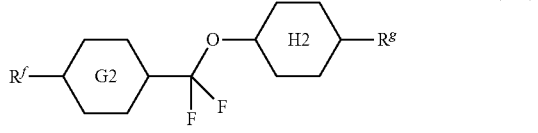

(C1h)

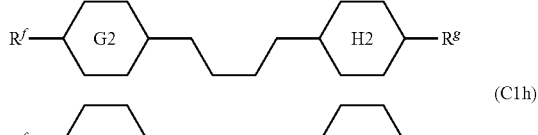

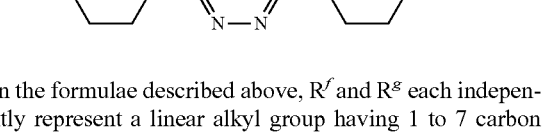

In the formulae described above, $R^f$ and $R^g$ each independently represent a linear alkyl group having 1 to 7 carbon atoms, a linear 1-alkenyl group having 2 to 7 carbon atoms, a linear 3-alkenyl group having 4 to 7 carbon atoms, a linear alkoxyl group having 1 to 3 carbon atoms, or a linear alkyl group having 1 to 5 carbon atoms with a terminal substituted with an alkoxyl group having 1 to 3 carbon atoms; and at least one of $R^f$ and $R^g$ represents a linear alkyl group having 1 to 7 carbon atoms, a linear 1-alkenyl group having 2 to 7 carbon atoms, or a linear 3-alkenyl group having 4 to 7 carbon atoms. However, when the rings G1 to G8 are aromatic rings, the corresponding $R^f$ does not represent a 1-alkenyl group or an alkoxyl group, and when the rings H1 to H8 are aromatic rings, the corresponding $R^g$ does not represent a 1-alkenyl group or an alkoxyl group.

The ring G1 and the ring H1 each independently represent a trans-1,4-cyclohexylene group, a trans-decahydronaphthalene-trans-2,6-diyl group, a 1,4-phenylene group which may be substituted with one or two fluorine atoms or methyl groups, a naphthalene-2,6-diyl group which may be substituted with one or more fluorine atoms, a tetrahydronaphthalene-2,6-diyl group which may be substituted with one or two fluorine atoms, a 1,4-cyclohexenylene group which may be substituted with one or two fluorine atoms, a 1,3-dioxane-trans-2,5-diyl group, a pyrimidine-2,5-diyl group, or a pyridine-2,5-diyl group. Each of these compounds preferably has one or less of a trans-decahydronaphthalene-trans-2,6-diyl group, a naphthalene-2,6-diyl group which may be substituted with one or more fluorine atoms, a tetrahydronaphthalene-2,6-diyl group which may be substituted with one or two fluorine atoms, a 1,4-cyclohexenylene group which may be substituted with a fluorine atom, a 1,3-dioxane-trans-2,5-diyl group, a pyrimidine-2,5-diyl group, or a pyridine-2,5-diyl group, and, in such a case, other rings are a trans-1,4-cyclohexylene group or a 1,4-phenylene group which may be substituted with one or two fluorine atoms or methyl groups. The ring G2 and the ring H2 each independently represent a trans-1,4-cyclohexylene group, a trans-decahydronaphthalene-trans-2,6-diyl group, a 1,4-phenylene group which may be substituted with one or two fluorine atoms or methyl groups, a naphthalene-2,6-diyl group which may be substituted with one or more fluorine atoms, or a tetrahydronaphthalene-2,6-diyl group which may be substituted with one or two fluorine atoms. Each of these compounds preferably has one or less of a trans-decahydronaphthalene-trans-2,6-diyl group, a naphthalene-2,6-diyl group which may be substituted with one or more fluorine atoms, a tetrahydronaphthalene-2,6-diyl group which may be substituted with one or two fluorine atoms, and, in such a case, other rings are a trans-1,4-cyclohexylene group or a 1,4-phenylene group which may be substituted with one or two fluorine atoms or methyl groups. The ring G3 and the ring H3 each independently represent a 1,4-phenylene group which may be substituted with one or two fluorine atoms or methyl groups, a naphthalene-2,6-diyl group which may be substituted with one or more fluorine atoms, or a tetrahydronaphthalene-2,6-diyl group which may be substituted with one or two fluorine atoms. Each of these compounds preferably has one or less of a naphthalene-2,6-diyl group which may be substituted with one or more fluorine atoms or a tetrahydronaphthalene-2,6-diyl group which may be substituted with one or two fluorine atoms.

The following compounds are more preferable.

[Chem. 17]

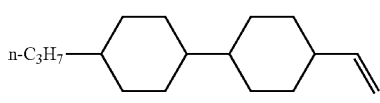
(C1a-1)

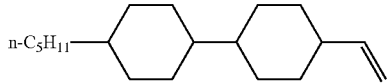
(C1a-2)

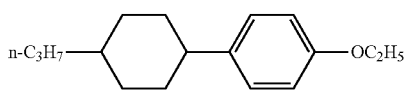
(C1a-3)

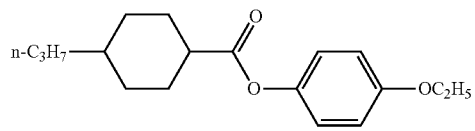
(C1b-1)

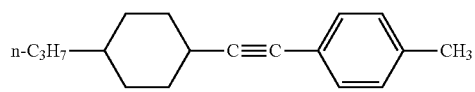
(C1c-1)

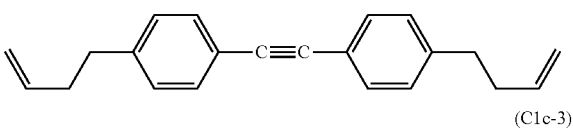
(C1c-2)

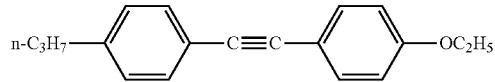
(C1c-3)

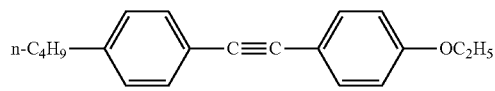
(C1c-4)

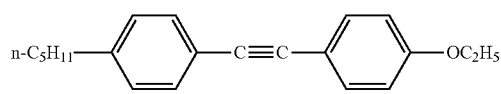
(C1c-5)

(C1c-6)

(C1c-7)

More preferable embodiments for (C2) can be expressed by the following general formulae, (C2a) to (C2m).

[Chem. 18]

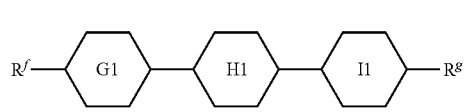
(C2a)

(C2b)

(C2c)
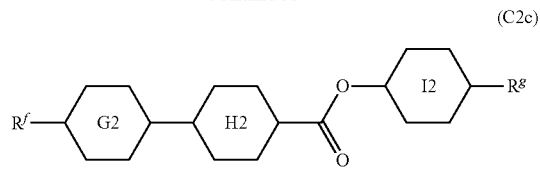

(C2d)

(C2e)

(C2f)
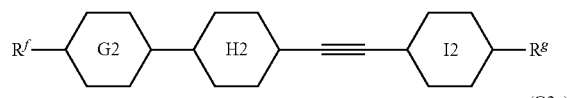

(C2g)
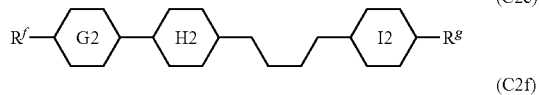

(C2h)
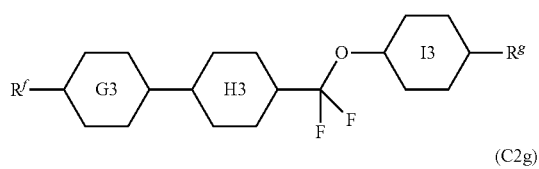

(C2i)

(C2j)
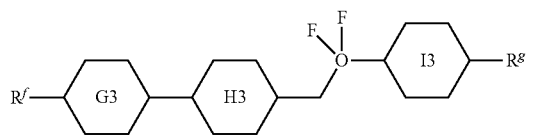

(C2k)
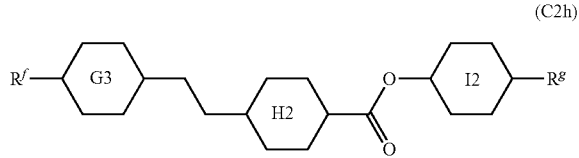

(C2l)
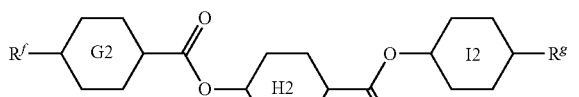

(C2m)
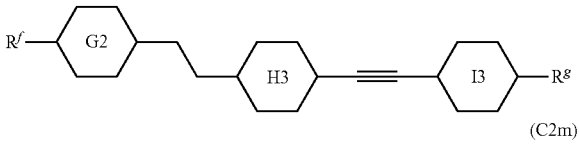

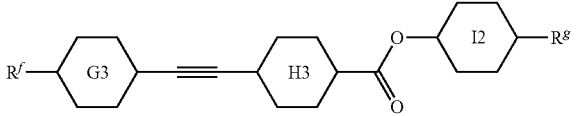

In the formulae, the ring G1, the ring G2, the ring G3, the ring H1, the ring H2, and the ring H3 are the same as those described above, and the ring I1, the ring G1, the ring I2, the ring G2, and the ring I3 are each the same as the ring G3. Each of these compounds preferably has one or less of a trans-decahydronaphthalene-trans-2,6-diyl group, a naphthalene-2,6-diyl group which may be substituted with one or more fluorine atoms, a tetrahydronaphthalene-2,6-diyl group which may be substituted with one or two fluorine atoms, a 1,4-cyclohexenylene group which may be substituted with a fluorine atom, a 1,3-dioxane-trans-2,5-diyl group, a pyrimidine-2,5-diyl group, or a pyridine-2,5-diyl group, and, in such a case, other rings are a trans-1,4-cyclohexylene group or a 1,4-phenylene group which may be substituted with one or two fluorine atoms or methyl groups.

The following compounds are more preferable.

[Chem. 19]

(C2a-1)

(C2a-2)
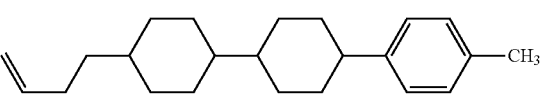

(C2a-3)
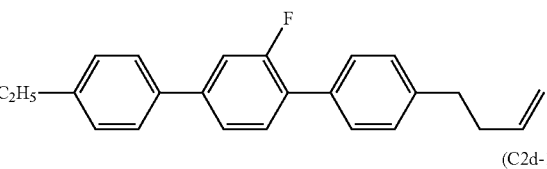

(C2d-1)
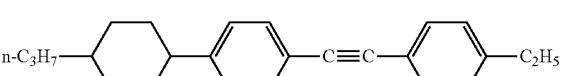

(C2d-2)
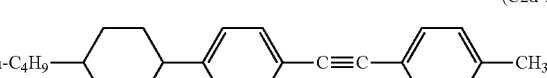

(C2d-3)
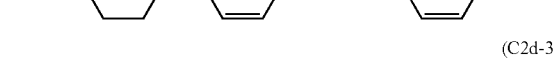

(C2d-4)
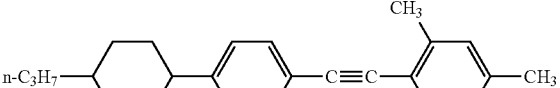

(C2I-1)
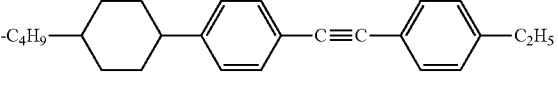

-continued (C2I-2)

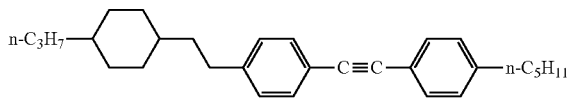

Next, more preferable embodiments for (C3) can be expressed by the following general formulae, (C3a) to (C3f).

[Chem. 20]

(C3a)

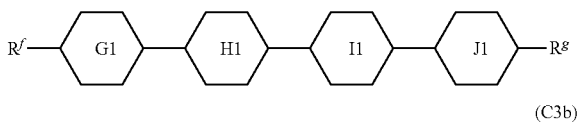

(C3b)

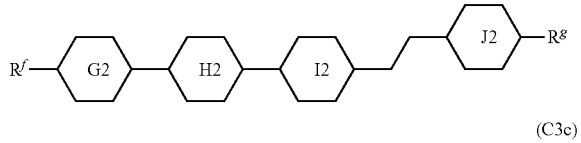

(C3c)

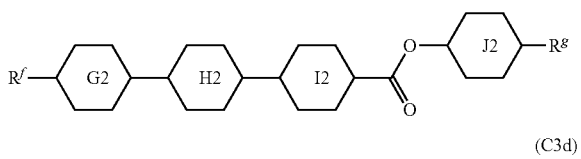

(C3d)

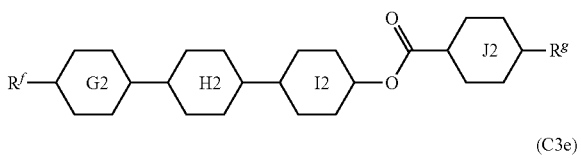

(C3e)

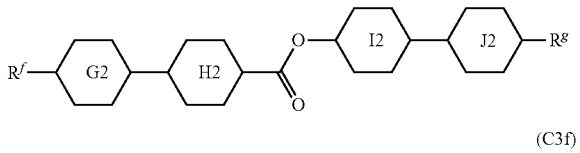

(C3f)

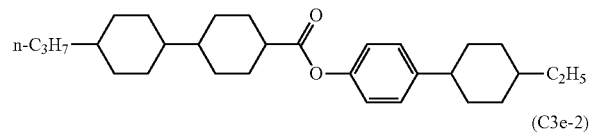

In the formulae, the ring G1, the ring G2, the ring H1, the ring H2, the ring I1, and the ring I2 are the same as those described above, and the ring J1, the ring G1, the ring J2, the ring G2, and the ring I3 are each the same as the ring G3. Each of these compounds preferably has one or less of a trans-decahydronaphthalene-trans-2,6-diyl group, a naphthalene-2,6-diyl group which may be substituted with one or more fluorine atoms, a tetrahydronaphthalene-2,6-diyl group which may be substituted with one or two fluorine atoms, a 1,4-cyclohexenylene group which may be substituted with a fluorine atom, a 1,3-dioxane-trans-2,5-diyl group, a pyrimidine-2,5-diyl group, or a pyridine-2,5-diyl group, and, in such a case, other rings are a trans-1,4-cyclohexylene group or a 1,4-phenylene group which may be substituted with one or two fluorine atoms or methyl groups The following compounds are more preferable.

[Chem. 21]

(C3e-1)

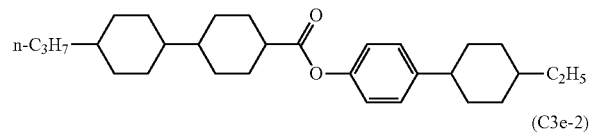

(C3e-2)

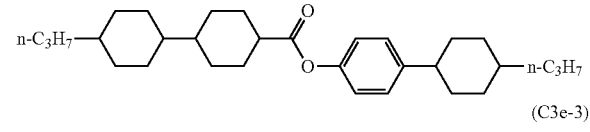

(C3e-3)

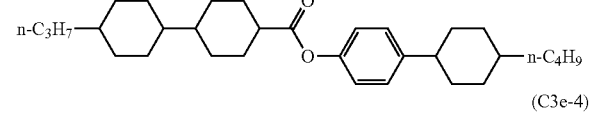

(C3e-4)

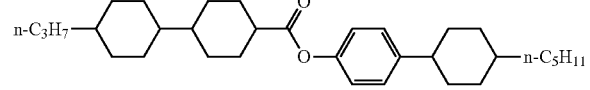

The lower limit of the preferable total content of the compounds represented by general formula (i), general formulae (A1) to (A3), general formulae (B1) to (B3), and general formulae (C1) to (C3) relative to the total of the composition of the present invention is 80%, 85%, 88%, 90%, 92%, 93%, 94%, 95%, 96%, 97%, 98%, 99%, or 100%. The preferable upper limit of the content is 100%, 99%, 98%, or 95%.

The lower limit of the preferable total content of the compounds represented by general formula (i), general formulae (A1a) to (A3c), general formulae (B1a) to (B2c), and general formulae (C1a) to (C3f) relative to the total of the composition of the present invention relative to the total of the composition of the present invention is 80%, 85%, 88%, 90%, 92%, 93%, 94%, 95%, 96%, 97%, 98%, 99%, or 100%. The preferable upper limit of the content is 100%, 99%, 98%, or 95%.

The composition of the present invention is preferably free of any compound that has a structure in which hetero atoms, such as oxygen atoms, are bonded to each other, such as a peroxide (—CO—OO—) structure, within the molecule.

When the reliability and the long-term stability of the composition are important, the content of the compound having a carbonyl group is preferably adjusted to 5% or less relative to the total mass of the composition, more preferably 3% or less, yet more preferably 1% or less, and most preferably substantially zero.

When the stability under UV irradiation is important, the content of the compounds having chlorine atoms as substituents is preferably adjusted to 15% or less relative to the total mass of the composition, more preferably 10% or less, yet more preferably 8% or less, still more preferably 5% or less, preferably 3% or less, and most preferably substantially zero.

The content of the compounds in which all of the ring structures within the molecule are six-membered rings is preferably high; and the content of the compounds in which all of the ring structures within the molecule are six-membered rings relative to the total mass of the composition is preferably 80% or more, more preferably 90% or more, and yet more preferably 95% or more, and most preferably the composition is substantially solely composed of compounds in which all of the ring structures within the molecule are six-membered rings.

In order to suppress deterioration of the composition by oxidation, the content of the compounds having cyclohexenylene groups as ring structures is preferably decreased; and the content of the compounds having cyclohexenylene groups relative to the total mass of the composition is preferably 10% or less, preferably 8% or less, more preferably 5% or less, preferably 3% or less, and yet more preferably substantially zero.

When improving the viscosity and improving Tni are important, the content of the compound having a 2-methylbenzene-1,4-diyl group, which may have a hydrogen atom substituted with a halogen, in the molecule is preferably decreased; and the content of the compounds having a 2-methylbenzene-1,4-diyl group in the molecule relative to the total mass of the composition is preferably 10% or less, preferably 8% or less, more preferably 5% or less, preferably 3% or less, and yet more preferably substantially zero.

In this description, substantially zero means that the substance is not contained but for the one contained unintentionally.

When a compound contained in the composition of the first embodiment of the present invention contains an alkenyl group in a side chain and the alkenyl group is bonded to cyclohexane, 2 to 5 carbon atoms are preferably contained in the alkenyl group. When the alkenyl group is bonded to benzene, 4 or 5 carbon atoms are preferably contained in the alkenyl group, and the unsaturated bond in the alkenyl group is preferably not directly bonded to benzene.

In order to enhance the stability of the liquid crystal composition of the present invention, an antioxidant is preferably added. Examples of the antioxidant include hydroquinone derivatives, nitrosoamino-based polymerization inhibitors, and hindered phenol-based antioxidants, and specific examples thereof include tert-butyl hydroquinone, methyl hydroquinone; "Q-1300" and "Q-1301" produced by Wako Pure Chemical Industries, Ltd.; and "IRGANOX1010", "IRGANOX1035", "IRGANOX1076", "IRGANOX1098", "IRGANOX1135", "IRGANOX1330", "IRGANOX1425", "IRGANOX1520", "IRGANOX1726", "IRGANOX245", "IRGANOX259", "IRGANOX3114", "IRGANOX3790", "IRGANOX5057", and "IRGANOX565" produced by BASF.

The amount of the antioxidant added relative to the polymerizable liquid crystal composition is preferably 0.01 to 2.0% by mass and more preferably 0.05 to 1.0% by mass.

In order to enhance the stability of the liquid crystal composition of the present invention, an UV absorber is preferably added. The UV absorber preferably has excellent UV absorption performance at a wavelength of 370 nm or less, and, from the viewpoint of good liquid crystal display properties, preferably has little absorption for visible light having a wavelength of 400 nm or more. More specific examples thereof include hindered phenol compounds, hydroxybenzophenone compounds, benzotriazole compounds, salicylic acid ester compounds, benzophenone compounds, cyanoacrylate compounds, nickel complex salt compounds, and triazine compounds. The examples of the hindered phenol compounds include 2,6-di-tert-butyl-p-cresol, pentaerythrityl-tetrakis[3-(3,5-di-tert-butyl-4-hydroxyphenyl) propionate], N, N'-hexamethylenebis (3,5-di-tert-butyl-4-hydroxy-hydrocinnamide), 1,3,5-trimethyl-2,4, 6-tris(3,5-di-tert-butyl-4-hydroxybenzyl)benzene, and tris-(3,5-di-tert-butyl-4-hydroxybenzyl)-isocyanurate.

Examples of the benzotriazole compounds include 2-(2'-hydroxy-5'-methylphenyl)benzotriazole, 2,2-methylenebis (4-(1,1,3,3-tetramethylbutyl)-6-(2H-benzotriazol-2-yl)phenol), (2,4-bis-(n-octylthio)-6-(4-hydroxy-3,5-di-tert-butylanilino)-1,3,5-triazine, triethylene glycol bis[3-(3-tert-butyl-5-methyl-4-hydroxyphenyl) propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, (2-(2'-hydroxy-3',5'-di-tert-amylphenyl)-5-chlorobenzotriazole, 2,6-di-tert-butyl-p-cresol, and pentaerythrityl-tetrakis[3-(3,5-di-tert-butyl-4-hydroxyphenyl) propionate]; and TINUVIN 109, TINUVIN 171, TINUVIN 326, TINUVIN 327, TINUVIN 328, TINUVIN 770, TINUVIN 900, and TINUVIN 928 produced by BASF Japan, and KEMISORB 71, KEMISORB 73, and KEMISORB 74 produced by CHEMIPRO KASEI KAISHA LTD., are also suitable for use.

EXAMPLES

The present invention will now be described in further details by way of examples below which do not limit the present invention. Furthermore, in the description below, "%" used for compositions of examples and comparative examples means "% by mass".

In the examples, the properties measured were as follows.

TNI: nematic phase-isotropic liquid phase transition temperature

T→N: phase transition temperature at which a nematic phase was generated

Δn: refractive index anisotropy at 298 K no:

Δε: dielectric anisotropy at 298 K

ε⊥:

$\gamma_1$: rotational viscosity at 298 K

Vth: a voltage at which the transmittance changed 10% at 298 K under crossed Nicol polarizers when the liquid crystal was sealed into a TN cell having a thickness of 8.5 microns VHR: voltage holding ratio (%) at 333 K under a frequency of 60 Hz and a voltage of 5 V VHR after heat resistance test: a test element group (TEG) for electrooptical property evaluation in which composition samples were sealed in was retained in a 130° C. thermostat for 1 hour and then the measurement was conducted by the same method for measuring the VHR described above.

Current Value:

The liquid crystal composition was vacuum-injected into a TN liquid crystal cell (cell gap: 8.3 μm), and sealed with an UV curable resin (Three Bond 3026 produced by Three-Bond Holdings Co., Ltd.) to prepare a liquid crystal cell.

Immediately after completion of preparation of the liquid crystal cell, the current was measured from a sample, this sample was assumed to be an initial sample (hereinafter referred to as Initial).

A sample of a liquid crystal cell irradiated with UV for 16 hours by using Suntest (produced by Original Hanau) was assumed to be an UV-irradiated sample (hereinafter referred to as UV).

A sample of a liquid crystal cell heated at 80° C. for 350 hours in an oven was assumed to be a heated sample (hereinafter referred to as Heated).

The current value was measured with a circuit illustrated in FIG. 1 by observing a voltage waveform at both ends of a 50 KΩ resistor in the circuit while square waves (Vap=2.5 V) were applied to the prepared liquid crystal cell. From the observed voltage waveform (FIG. 2), Vr (mV) was measured, and the current value was calculated from Vr and a liquid crystal cell electrode area: W (cm$^2$) by the following equation:

$$Ir(\mu A/cm^2) = Vr/(50 \times W) \quad \text{[Math. 1]}$$

During this process, three liquid crystal cells were prepared under respective conditions, the current values thereof were measured, and the current values of the three cells were averaged so that the average was used as an indicator of reliability in the panels.

Image-Sticking:

Image-sticking of the liquid crystal display device was evaluated by measuring the testing time that took the after-image of a fixed pattern uniformly displayed in all parts of the screen to reach the unacceptable level after the fixed pattern was displayed for a particular testing time in the display area.
1) The testing time referred here is the length of time the fixed pattern was displayed, and a long testing time indicates suppression of afterimage and indicates high performance.
2) The unacceptable level is a level at which the afterimage enough to make a product fail in the shipping fail/pass test was observed.

Example)
Sample A: 1000 hours
Sample B: 500 hours
Sample C: 200 hours
Sample D: 100 hours
The performance is in the order of A>B>C>D.

Drop Marks:

Drop marks of the liquid crystal display device were evaluated through the following five-grade evaluation by visually observing drop marks that appear white in an entirely black display.
5: No drop marks (excellent)
4: Drop marks were slightly observed but were at acceptable level (good)
3: Drop marks were slightly observed and were at the pass/fail borderline level (pass under some conditions)
2: Drop marks were observed and were at unacceptable level (fail)
1: Drop marks were observed and the quality was poor (poor)

Process Compatibility:

The process compatibility was evaluated through an ODF process by dropping the liquid crystal 50 pL at a time using a constant volume measurement pump and measuring the total mass of the liquid crystal dropped in every 100 times of dropping, a total in 0 to 100th dropping operations, 101st to 200th dropping operations, 201st to 300th dropping operations, and so on. The number of times dropping was conducted until the variation in mass was so large that the ODF process could no longer be carried out was used as the basis for evaluation.

A large number of times of dropping means that the liquid crystal can be stably dropped over a long period of time and that the process compatibility is high.

Example)
Sample A: 95000 times
Sample B: 40000 times
Sample C: 100000 times
Sample D: 10000 times
The performance is in the order of C>A>B>D.

Low-temperature Storage Property:

Low-temperature storage property was evaluated by weighing 0.5 g of a prepared composition into a 1 mL sample jar, storing the jar with the weighed composition in a −25° C. temperature control test vessel for 240 hours, and observing occurrence of precipitates from the composition by naked eye. The testing time taken until precipitates were observed was measured. The longer the testing time until occurrence of precipitation, the better the low-temperature storage property.

Volatility/Production Facility Contamination Property:

Volatility of the liquid crystal material was evaluated by visually observing foaming of the liquid crystal material while monitoring the operation state of a vacuum stirring defoaming mixer with a stroboscope. Specifically, 0.8 kg of the composition was placed in a 2.0 L special container of a vacuum stirring defoaming mixer, and the vacuum stirring defoaming mixer was driven at a revolution velocity of 15 S-1 and a rotating velocity of 7.5 S-1 under evacuation of 4 kPa. The time taken until foaming began was measured. The longer the time until foaming began, the lower the volatility and the lower the possibility of production facility contamination, indicating high performance.

Example)
Sample A: 200 seconds
Sample B: 45 seconds
Sample C: 60 seconds
Sample D: 15 seconds
The performance is in the order of A>C>B>D. In the examples, following abbreviations are used to describe compounds.

(Ring Structure)

[Chem. 22]

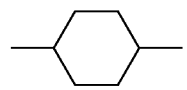
Cy

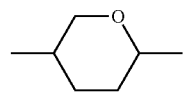
Py

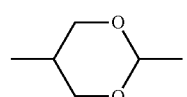
Dy

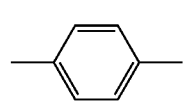
Ph

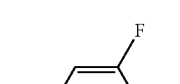
Ph1

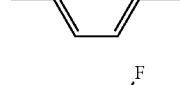
Ph3

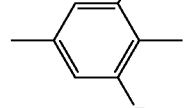
Pa2

-continued

Pa3 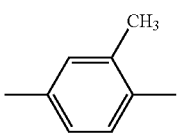

Ma 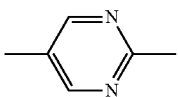

Np 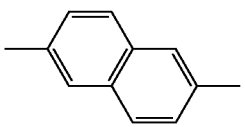

Np1 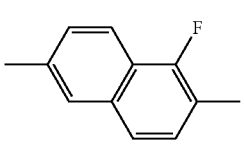

Np3 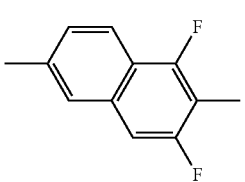

A trans isomer is indicated unless otherwise noted.
(Side Chain Structure and Linking Structure)

TABLE 1

| Notations in the formula | Substituents and linking groups the notations represent |
|---|---|
| 1- | $CH_3$— |
| 2- | $C_2H_5$— |
| 3- | $n-C_3H_7$— |
| 4- | $n-C_4H_9$— |
| 5- | $n-C_5H_{11}$— |
| V— | $CH_2=CH$— |
| V2— | $CH_2=CH—CH_2—CH_2$— |
| 1V2— | $CH_3—CH=CH—CH_2—CH_2$— |
| -1 | —$CH_3$ |
| -2 | —$C_2H_5$ |
| -3 | -n-$C_3H_7$ |
| —O2 | —$OC_2H_5$ |
| —V0 | —$CH=CH_2$ |
| —V1 | —$CH=CH—CH_3$ |
| —2V | —$CH_2—CH_2—CH=CH_2$ |
| —F | —F |
| —OCF3 | —$OCF_3$ |
| —CN | —CN |
| — | Single bond |
| -E- | —COO— |
| —CH2CH2— | —$CH_2CH_2$— |
| —CFFO— | —$CF_2O$— |
| -T- | —C≡C— |
| —O1— | —$OCH_2$— |

Examples 1 to 3 and Comparative Example 1

A liquid crystal composition of the present invention and a liquid crystal display device that used the composition were prepared, and the physical property values were measured.

It was found that, compared with the composition of Example 1, the composition of Comparative Example 1 that did not contain a compound represented by formula (i) had about the same level of Tni but had an increased Vth value. Moreover, since the nematic phase lower limit temperature is as high as 0° C., this liquid crystal composition is not practicable.

TABLE 2

| | Comparative Example 1 | Example 1 | Example 2 | Example 3 |
|---|---|---|---|---|
| $T_{NI}$ | 120.2 | 119.8 | 121.0 | 118.0 |
| $T_{\to N}$ | S > 0 | G-36 | G-32 | G-23 |
| Δn | 0.2617 | 0.2691 | 0.2685 | 0.2586 |
| $n_o$ | 1.5160 | 1.5182 | 1.5178 | 1.5171 |
| η | 60.4 | 82.6 | 82.3 | 79.5 |
| $V_{th}$ | 2.165 | 1.838 | 1.886 | 1.889 |
| 3-Cy-Ph3—CN | | | | 4 |
| 2-Ph-E-Ph1—CN | | | 2 | |
| 3-Ph-E-Ph1—CN | | | 2 | |
| 1V-Cy-Ph1—CN | | | | 4 |
| 3-Ma-Ph3—CN | 4 | 4 | | |
| 5-Ph—Ph—CN | | | | |
| 4-Ma-Ph—CN | 2 | 2 | 2 | |
| 5-Ma-Ph—CN | 2 | 2 | 2 | |
| V2—Ph-T-Ph—2V | 6 | | | |
| 3-Ph-T-Ph-1 | 6 | | | |
| 4-Ph-T-Ph—O2 | 6 | | | |
| 5-Ph-T-Ph—O2 | 6 | | | |
| 5-Ph-T-Pa2—O2 | 10 | 10 | 10 | 10 |
| V-Cy-Cy-Ph-1 | 5 | 5 | 5 | 5 |
| V2-Cy-Cy-Ph-1 | 9 | 9 | 9 | 9 |
| 3-Cy-Ph-T-Ph-2 | 4 | 4 | 4 | 4 |
| 4-Cy-Ph-T-Ph-1 | 4 | 4 | 4 | 4 |
| 3-Cy-Ph-T-Pa2-1 | 10 | 10 | 10 | 10 |
| 3-Cy-E-Ph-T-Ph-1 | | | | |
| 3-Ph—Ph1—Ph—CN | 13 | 13 | 13 | 13 |
| 3-Ph1—Ph—Ph3—CN | | | | |
| 5-Ph—Ph—Ph—CN | | | | |
| 4-Ph-Ma-Ph—CN | | | | |
| 4-Ph—Ph1—Ph—CN | 8 | 8 | 8 | 8 |
| 5-Ph—Ph1—Ph—CN | 5 | 5 | 5 | 5 |
| (i-1) | | 8 | 8 | 8 |
| (i-2) | | 4 | 4 | 4 |
| (i-3) | | 8 | 8 | 8 |
| (i-4) | | 4 | 4 | 4 |

Examples 4 and 5 and Comparative Example 2

A liquid crystal composition of the present invention and a liquid crystal display device that used the composition were prepared, and the physical property values were measured.

It is difficult to increase the value of Δn of the composition of Comparative Example 2 that does not contain a compound represented by formula (i). In contrast, the composition of the present application exhibits Δn as high as 0.320. Moreover, the nematic phase lower limit temperatures of these compositions were 0° C. or lower, demonstrating outstanding properties.

TABLE 3

| | Comparative Example 2 | Example 4 | Example 5 |
|---|---|---|---|
| $T_{NI}$ | 130.9 | 113.3 | 105.9 |
| $T_{\to N}$ | C > 0 | S-10 | S-8 |
| Δn | 0.291 | 0.320 | 0.319 |
| $n_o$ | 1.523 | 1.528 | 1.528 |
| Δε | | 21.5 | 19.1 |
| $\varepsilon_\perp$ | | 5.1 | 5.0 |
| η | 133.7 | 178.7 | 150.4 |
| $V_{th}$ | 1.877 | 1.64 | 1.71 |
| 3-Ma-Ph3—CN | 4 | | |

TABLE 3-continued

| | Comparative Example 2 | Example 4 | Example 5 |
|---|---|---|---|
| 4-Ma-Ph—CN | 2 | | |
| 5-Ma-Ph—CN | 2 | | |
| 4-Ph-T-Pa2—O2 | 13 | 7.7 | 6.7 |
| 5-Ph-T-Pa2—O2 | 13 | 8 | 7 |
| 3-Ph1—Ph—Ph3—CN | | 6 | |
| 3-Ph—Ph1—Ph—CN | 16 | 14 | 15 |
| 4-Ph—Ph1—Ph—CN | 12 | 10 | 9 |
| 5-Ph—Ph1—Ph—CN | 8 | 5 | 5 |
| 3-Cy-Ph-T-Pa2-1 | 11 | | |
| 4-Cy-Ph-T-Pa2-1 | 11 | | |
| 5-Ph—Ph—Ph—CN | | 5 | 5 |
| 4-Ph-Ma-Ph—CN | 8 | 10 | 8 |
| (i-1) | | 12 | 14 |
| (i-2) | | 5 | 8 |
| (i-3) | | 12 | 14 |
| (i-4) | | 5 | 8 |

Example 6

A liquid crystal composition that contained 99.7% of the liquid crystal composition of Example 4, 0.2% of KEMISORB 71 produced by CHEMIPRO KASEI KAISHA LTD., and 0.1% of IRGANOX 1076 produced by BASF was prepared. A liquid crystal lens was prepared by using this liquid crystal composition, and it was confirmed that this lens exhibited excellent lens properties.

Example 7

A liquid crystal composition that contained 99.7% of the liquid crystal composition of Example 5, 0.2% of KEMISORB 71 produced by CHEMIPRO KASEI KAISHA LTD., and 0.1% of IRGANOX 1076 produced by BASF was prepared. A liquid crystal lens was prepared by using this liquid crystal composition, and it was confirmed that this lens exhibited excellent lens properties.

The invention claimed is:

1. A liquid crystal composition comprising at least one compound represented by general formula (i):

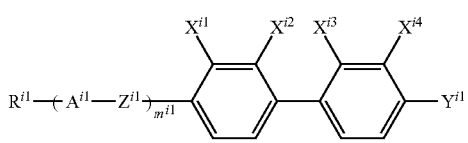

in the formula, $R^{i1}$ represents an alkynyl group having 2 to 12 carbon atoms, one —$CH_2$— or two or more non-adjacent —$CH_2$— in the alkynyl group may each independently be substituted with —CH=CH—, —C≡C—, —O—, —CO—, —COO—, or OCO—, and one or two or more hydrogen atoms present in $R^{i1}$ may each independently be substituted with a fluorine atom, $Y^{i1}$ represents a hydrogen atom, a cyano group, or an alkyl group having 1 to 12 carbon atoms, one —$CH_2$— or two or more non-adjacent —$CH_2$— in the alkyl group may each independently be substituted with —CH=CH—, —C≡C—, —O—, —CO—, —COO—, or OCO—, $X^{i1}$ to $X^{i4}$ each independently represent a hydrogen atom or a fluorine atom, $X^{i1}$ and $X^{i2}$ never represent fluorine atoms at the same time, $X^{i3}$ and $X^{i4}$ never represent fluorine atoms at the same time, but at least one of $X^{i1}$ to $X^{i4}$ is a fluorine atom, $A^{i1}$ represents a group selected from the group consisting of:

(a) a 1,4-cyclohexylene group, one —$CH_2$— or two or more non-adjacent —$CH_2$— present in this group may each be substituted with —O—, (b) a 1,4-phenylene group, one —CH= or two or more non-adjacent —CH= present in this group may each be substituted with —N=, and (c) a naphthalene-2,6-diyl group, a 1,2,3,4-tetrahydronaphthalene-2,6-diyl group, or a decahydronaphthalene-2,6-diyl group, one —CH= or two or more non-adjacent —CH= present in the naphthalene-2,6-diyl group or the 1,2,3,4-tetrahydronaphthalene-2,6-diyl group may each be substituted with —N=, where the group (a), the group (b), and the group (c) may each independently be substituted with a halogen atom or a cyano group, $Z^{i1}$ represents —$OCH_2$—, —$CH_2O$—, —$C_2H_4$—, —$C_4H_8$—, —COO—, —OCO—, —CH=CH—, —CF=CF—, —$CF_2O$—, —$OCF_2$—, —$CF_2CF_2$—, —C≡C— or a single bond, and $m^{i1}$ represents 0 or 1.

2. The liquid crystal composition according to claim 1, wherein, in general formula (i), $Y^{i1}$ represents a cyano group.

3. The liquid crystal composition according to claim 1, wherein, in general formula (i), $m^{i1}$ represents 0.

4. The liquid crystal composition according to claim 1, further comprising at least one compounds represented by general formulae (A1) to (A3):

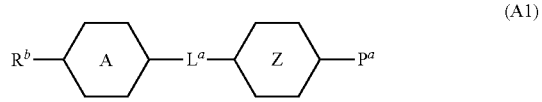

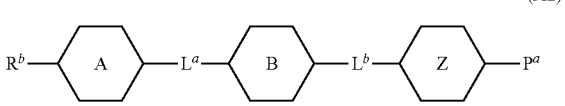

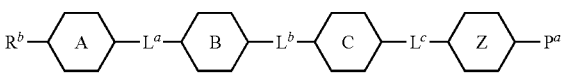

in the formulae, $R^b$ represents an alkyl group having 1 to 12 carbon atoms, may be linear or have a methyl or ethyl branch, and may have a three- to six-membered ring structure; any —$CH_2$— present in the group may be substituted with —O—, —CH=CH—, —CH=CF—, —CF=CH—, —CF=CF—, or —C≡C—; any hydrogen atom present in the group may be substituted with a fluorine atom or a trifluoromethoxy group; and when an asymmetric carbon is generated by branching, the compound may be optically active or racemic, the ring A, the ring B, and the ring C each independently represent a trans-1,4-cyclohexylene group, a trans-decahydronaphthalene-trans-2,6-diyl group, a 1,4-phenylene group which may be substituted with one or more fluorine atoms, a naphthalene-2,6-diyl group which may be substituted with one or more fluorine atoms, a tetrahydronaphthalene-2,6-diyl group which may be substituted with one or more fluorine atoms, a 1,4-cyclohexenylene group which may be substituted with a fluorine atom, a 1,3-dioxane-trans-2,5-diyl group, a pyrimidine-2,5diyl group, or a pyridine-2,5-diyl group, $L^a$, $L^b$, and $L^c$ each independently represent a single bond, an ethylene group —CH$_2$CH$_2$—, a 1,2-propylene group, —CH(CH$_3$)CH$_2$— and —CH$_2$CH(CH$_3$)—, a 1,4-butylene group, —COO—, —OCO—, —OCF$_2$—, —CF$_2$O—, —CH=CH—, —CH=CF—, —CF=CH—, —CF=CF—, —C≡C—, or —CH=NN=CH—, the ring Z represents a substituent represented by general formulae (La) to (Lc):

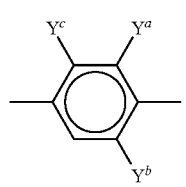

(La)

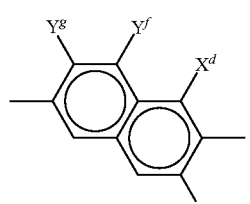

(Lb)

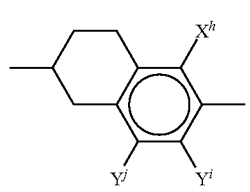

(Lc)

in the formulae, $Y^a$ to $Y_j$ each independently represent a hydrogen atom or a fluorine atom, $P^a$ represents a fluorine atom, a chlorine atom, a trifluoromethoxy group, a difluoromethoxy group, a trifluoromethyl group, or a difluoromethyl group, or an alkoxyl, alkyl, alkenyl, or alkenyloxy group having 2 or 3 carbon atoms and substituted with two or more fluorine atoms, when compounds represented by general formulae (A1) to (A3) are used in combination, the same alternatives such as the ring A, $L^a$, etc., in different molecules may represent the same substituent or different substituents, and in general formulae (A1) to (A3), compounds represented by the general formulae (i) are excluded.

5. The liquid crystal composition according to claim 1, further comprising at least one compounds represented by general formulae (B1) to (B3):

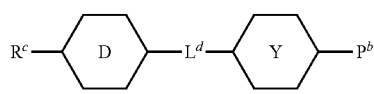

(B1)

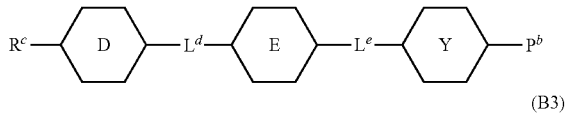

(B2)

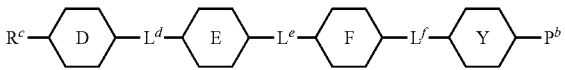

(B3)

in the formulae, $R^c$ represents an alkyl group having 1 to 12 carbon atoms, may be linear or have a methyl or ethyl branch, and may have a three- to six-membered ring structure; any —CH$_2$— present in the group may be substituted with —O—, —CH=CH—, —CH=CF—, —CF=CH—, —CF=CF—, or —C≡C—; any hydrogen atom present in the group may be substituted with a fluorine atom or a trifluoromethoxy group; and when an asymmetric carbon is generated by branching, the compound may be optically active or racemic, the ring D, the ring E, and the ring F each independently represent a trans-1,4-cyclohexylene group, a trans-decahydronaphthalene-trans-2,6-diyl group, a 1,4-phenylene group which may be substituted with one or more fluorine atoms, a naphthalene-2,6-diyl group which may be substituted with one or more fluorine atoms, a tetrahydronaphthalene-2,6-diyl group which may be substituted with one or more fluorine atoms, a 1,4-cyclohexenylene group which may be substituted with a fluorine atom, a 1,3-dioxane-trans-2,5-diyl group, a pyrimidine-2,5-diyl group, or a pyridine-2,5-diyl group, $L^d$, $L^e$, and $L^f$ each independently represent a single bond, an ethylene group, —CH$_2$CH$_2$—, a 1,2-propylene group, —CH(CH$_3$)CH$_2$— and —CH$_2$CH(CH$_3$)—, a 1,4-butylene group, —COO—, —OCO—, —OCF$_2$—, —CF$_2$O—, —CH=CH—, —CH=CF—, —CF=CH—, —CF=CF—, —C≡C—, —OCH$_2$—, —CH$_2$O—, or —CH=NN=CH—, the ring Y is an aromatic ring and represents a substituent represented by general formulae ($L^d$) to ($L^f$) below:

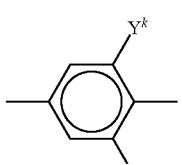

(Ld)

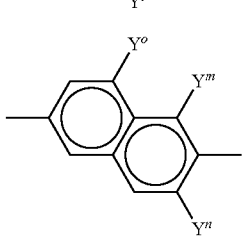

(Le)

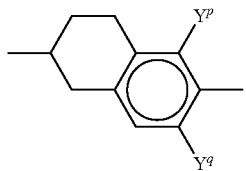
(Lf)

in the formulae, $Y^k$ to $Y^q$ each independently represent a hydrogen atom or a fluorine atom, the terminal group $P^b$ represents a cyano group (—CN), a cyanato group (—OCN), or —C≡CCN, when compounds represented by general formulae (B1) to (B3) are used in combination, the same alternatives such as the ring D, $L^d$, etc., in different molecules may represent the same substituent or different substituents, and in general formulae (B1) to (B3), compounds represented by the general formulae (i) are excluded.

6. The liquid crystal composition according to claim 1, further comprising at least one compound compounds represented by general formulae (C1) to (C3):

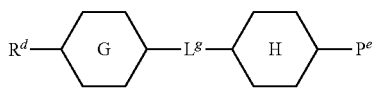
(C1)

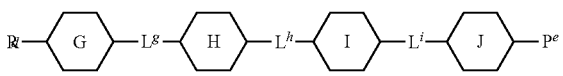
(C2)

(C3)

in the formulae, $R^d$ and $P^e$ each independently represent an alkyl group having 1 to 12 carbon atoms, may be linear or have a methyl or ethyl branch, and may have a three- to six-membered ring structure; any —CH$_2$— present in the group may be substituted with —O—, —CH=CH—, —CH=CF—, —CF=CH—, —CF=CF—, or —C≡C—; and any hydrogen atom present in the group may be substituted with a fluorine atom or a trifluoromethoxy group, the ring G, the ring H, and the ring I, and the ring J each independently represent a trans-1,4-cyclohexylene group, a trans-decahydronaphthalene-trans-2,6-diyl group, a 1,4-phenylene group which may be substituted with one or two fluorine atoms or methyl groups, a naphthalene-2,6-diyl group which may be substituted with one or more fluorine atoms, a tetrahydronaphthalene-2,6-diyl group which may be substituted with one or two fluorine atoms, a 1,4-cyclohexenylene group which may be substituted with one or two fluorine atoms, a 1,3-dioxane-trans-2,5-diyl group, a pyrimidine-2,5-diyl group, or a pyridine-2,5-diyl group, $L^g$, $L^h$, and $L^i$ each independently represent a single bond, an ethylene group —CH$_2$CH$_2$—, a 1,2-propylene group —CH(CH$_3$)CH$_2$— and —CH$_2$CH(CH$_3$)—, a 1,4-butylene group, —COO—, —OCO—, —OCF$_2$—, —CF$_2$O—, —CH=CH—, —CH=CF—, —CF=CH—, —CF=CF—, —C≡C—, or —CH=NN=CH—, when compounds represented by general formulae (C1) to (C3) are used in combination, the same alternatives such as the ring G, $L^g$, etc., in different molecules may represent the same substituent or different substituents, and in general formulae (C1) to (C3), compounds represented by the general formulae (A1) to (A3), (B1) to (B3), and the general formulae (i) are excluded).

7. The liquid crystal composition according to claim 1, wherein a refractive index anisotropy of the liquid crystal composition is 0.15 or more.

8. The liquid crystal composition according to claim 1, further comprising at least one component selected from the group consisting of an antioxidant, an ultraviolet protective agent, a chelating agent, an antistatic agent, and a dichroic dye.

9. A liquid crystal display device comprising the liquid crystal composition according to claim 1.

10. A liquid crystal lens comprising the liquid crystal composition according to claim 1.

11. A birefringence lens for stereoscopic image display, the birefringence lens comprising the liquid crystal composition according to claim 1.

12. The liquid crystal composition according to claim 1, wherein a content of the compound (i) in the liquid crystal composition is 5% by mass or more.

* * * * *